Figure 1:
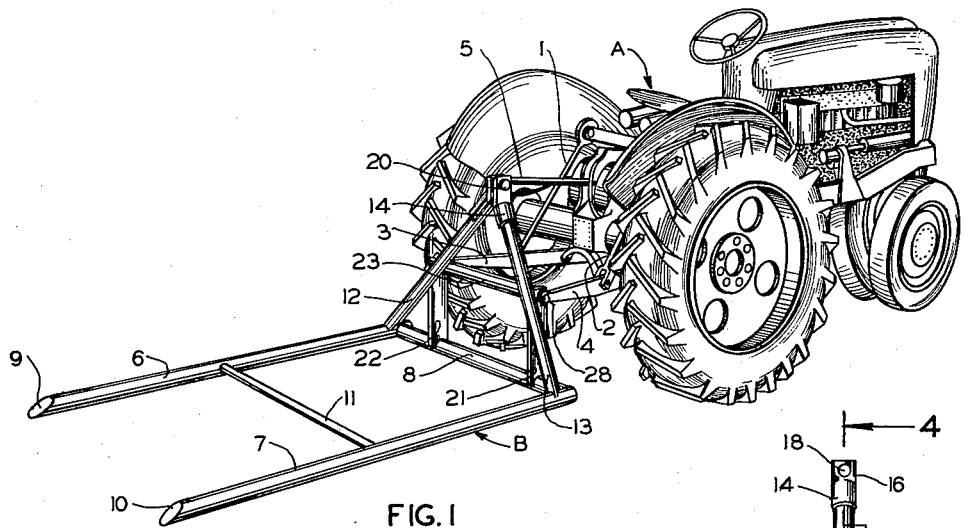

Oct. 17, 1961  J. F. REYNOLDS  3,004,677
GENERAL-UTILITY ACCESSORY DEVICES FOR AGRICULTURAL
TRACTORS AND THE LIKE
Filed April 6, 1959

*INVENTOR.*
JOSEPH F. REYNOLDS

BY Alfred W. Petchaft

ATTORNEY

United States Patent Office 3,004,677
Patented Oct. 17, 1961

3,004,677
GENERAL-UTILITY ACCESSORY DEVICES FOR AGRICULTURAL TRACTORS AND THE LIKE
Joseph F. Reynolds, Rte. 3, Carrollton, Ill.
Filed Apr. 6, 1959, Ser. No. 804,460
3 Claims. (Cl. 214—140)

This invention relates in general to certain new and useful improvements in agricultural implements and, more particularly, to a general-utility accessory device for agricultural tractors and the like.

At the present time, most farmers, ranchers, and fruit growers possess power-driven tractors and similar types of motor-driven equipment. Usually, such devices include one or more hydraulic cylinders which are operatively connected to arms, booms, or linkages suitable for actuating accessory devices. In many cases, the hitch is connected with a hydraulic cylinder so that the hitch can be raised or lowered to engage a plow, a harrow or some similar piece of tractor-drawn equipment. These hydraulic cylinders can also be utilized for actuating load-lifting and load-carrying accessory devices which, in effect, convert the tractor into a very convenient and labor-saving transport unit.

It is immediately evident that a transport unit of this type has many uses in farming and similar agricultural activities. For example, in hog-raising, it is necessary to lift up and move hog shelters which conventionally are of rather cumbersome triangular shape. Heretofore, this unpleasant work has been done by manual labor and, thus, becomes a time-consuming, back-breaking job. Such work, however, could be materially speeded up and simplified with an appropriate transport-device.

Many other agricultural tasks can be likewise facilitated, but the average farmer cannot afford to own a special piece of equipment designed solely for lifting and transporting. Some efforts have been made to solve this problem by providing a complete hydraulically powered fork-lift attachment which can be mounted on tractors, thereby converting them, more or less permanently, into a fork-lift truck. Such devices have the obvious disadvantage of being very expensive, as well as cumbersome, and, moreover, such fork-lift attachments must be connected, more or less permanently, into the hydraulic system of the tractor and this hook-up requires a good deal of mechanical skill and time. Finally, existing types of fork-lift attachments are not particularly large or strong and, therefore, have very limited utility for agricultural purposes.

It is, therefore, the primary object of the present invention to provide a fork-lift attachment which can be quickly and conveniently connected to the existing hydraulic lift mechanisms of farm tractors and similar motor driven vehicles, so that such vehicles may be very quickly and simply adapted for lifting and transporting a wide variety of objects which ordinarily must be moved from time to time in agricultural operations.

It is another object of the present invention to provide a fork-lift attachment of the type stated which is extremely rugged and is of such size and construction as to be capable of almost universal use in agricultural operations.

It is a further object of the present invention to provide a fork-lift attachment of the type stated which consists of a relatively small number of parts uniquely interconnected so as to be capable of construction at relatively modest cost.

It is an additional object of the present invention to provide a fork-lift attachment of the type stated which may be quickly mounted or demounted from a farm tractor or similar motor driven vehicle with ordinary hand tools and without any particular or unusual degree of mechanical skill.

With the above and other objects in view, my invention resides in the novel features of form, construction, arrangement, and combination of parts presently described and pointed out in the claims.

Figure 2:
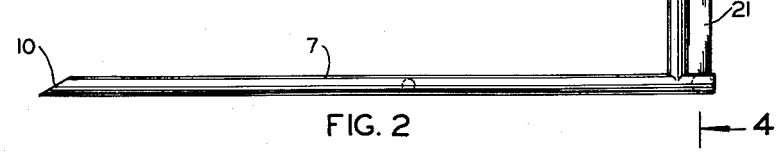
Figure 3:
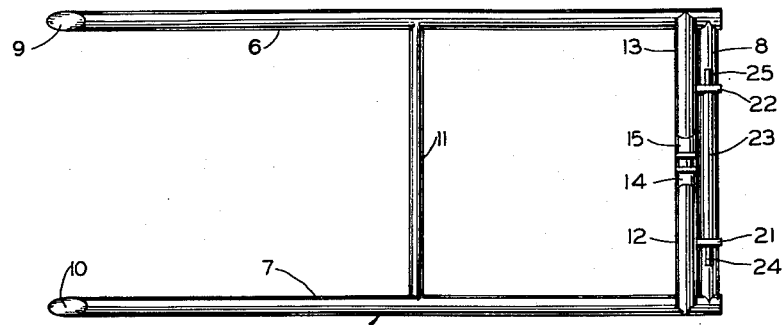
Figure 4:
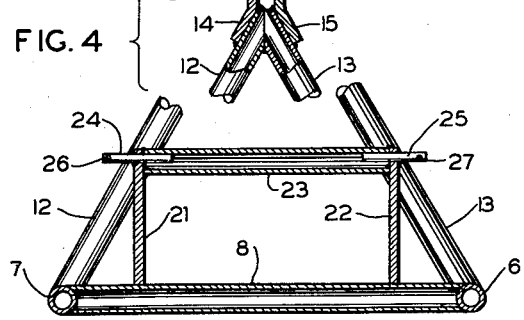

In the accompanying drawing:
FIG. 1 is a perspective view of a conventional type of farm tractor equipped with a fork-lift attachment constructed in accordance with and embodying the present invention;
FIG. 2 is a side elevational view of the fork-lift attachment;
FIG. 3 is a top plan view of the fork-lift attachment; and
FIG. 4 is a fragmentary vertical sectional view taken along line 4—4 of FIG. 2.

Referring now in more detail and by reference characters to the drawings, which illustrate a preferred embodiment of the present invention, A designates a conventional type of farm tractor provided with a remote hydraulic cylinder which is built into the transmission and is operatively controlled by a suitable valve located in a conveniently accessible position for manipulation by the operator. The remote hydraulic cylinder, valves, transmission, and other elements of the tractor are entirely conventional and do not form a part of the present invention; therefore, such elements are not specifically shown or described in detail herein. It is merely sufficient, for present purposes, to point out that the hydraulic unit is operably connected by conventional links 1, 2, to hitch links 3, 4, respectively, which are, in turn, pivotally mounted upon, and project rearwardly from, the rear end of the tractor chassis. Also pivotally mounted upon, and projecting rearwardly from, the rear end of the tractor chassis, in upwardly spaced relation to the hitch links 3, 4, is a stabilizing rod 5, which, in conjunction with the hitch links 3, 4, constitute a conventional three-point hitch, by which various accessory farm implements, such as a disk-plow, a harrow, a rake, or similar device, may be attached to the tractor A.

Provided for removable attachment to the three-point hitch of the tractor A is the fork-lift attachment B comprising two relatively long parallel tubular side bars 6, 7, welded at their rear ends to a transversely extending tubular cross-bar 8. At their other or free ends, the side bars 6, 7, are beveled in the provision of slide faces 9, 10, respectively, and intermediate their ends, the side bars 6, 7, are cross-connected by a tubular brace-member 11. Welded at their lower ends to the side bars 6, 7, a short distance forwardly from the cross-bar 8, are two upwardly and inwardly converging end-members 12, 13, formed preferably of the same tubular stock as the side bars 6, 7, and being welded together at their upper ends in symmetrical relation to the side bars 6, 7. Welded upon the outer faces of the end-members 12, 13, adjacent their common apex, are two brackets 14, 15, respectively, integrally formed with upwardly projecting parallel ears 16, 17, which are provided with axially aligned and registering apertures 18, 19.

These apertures 18, 19, are located so as to line up with a corresponding aperture in the link 5 and receive a pin 20, by which the upper end of the fork-lift attachment B can be secured to this link 5.

Welded upon the upper face, and extending vertically upwardly from the cross-bar 8, are two heavy strap members 21, 22, which are respectively located equidistantly inwardly from the side bars 6, 7, and are welded along their forwardly presented edge-faces, adjacent their upper ends, to the rear faces of the end-members 12, 13. Also welded to the end-members 12, 13, and extending horizontally therebetween, is an auxiliary cross-member 23 which extends between the strap members 21, 22, and is butt welded at its ends to the upper ends of such strap members 21, 22. Extending through the upper ends of the strap members 21, 22, into the interior of the cross-member 23, and welded rigidly therein, are two coaxial pins 24, 25, which project outwardly from the strap members 21, 22, and, adjacent their outer ends, are provided with diametral apertures 26, 27, respectively. The pins 24, 25, are inserted through the open eyes at the outer ends of the hitch links 3, 4, and are held therein by cotter-pins 28, which are inserted through the apertures 26, 27.

It should be noted that the bracing arrangement at the end of the fork-lift attachment B is uniquely cantilevered so as to provide an unusual degree of structural strength and stability to the entire structure for purposes of lifting loads deposited upon the outer portions of the side bars 6, 7. This is achieved by connecting the rear ends of the side bars 6, 7, by the cross-member 8, which is located substantially to the rear of the angular end-members 12, 13. In addition, the vertical strap members 21, 22, are located rearwardly of the end-members 12, 13, but are connected thereto along their forward edge faces, all as best seen in FIGS. 2 and 3. Moreover, the pins 24, 25, are located rearwardly in relation to the pin 20.

In use, the fork-lift attachment B can very readily be attached to the tractor A by slipping the pins 24, 25, into the eyes at the ends of the hitch links 3, 4, and securing them in place with cotter-pins 28. Similarly, the upper end of the fork-lift attachment B can be connected to the link 5 by the pins 20, which also may be conventionally held in place by suitable cotter-pins. When thus connected to the tractor A, the fork-lift attachment B can be used for lifting and transporting a wide variety of different objects which may be encountered in the course of ordinary agricultural work. For instance, the triangularly shaped hog shelters which are widely used in raising hogs can be readily lifted and transported from place to place or taken to a cleaning trough for cleansing. Piles of brush can be readily speared and lifted up by the fork-lift attachment B for transportation from one location to another in clearing away overgrown areas of arable land. Many other similar agricultural tasks can be simplified and facilitated by the use of the fork-lift attachment B constructed in accordance with the present invention.

It should be understood that changes and modifications in the form, construction, arrangement, and combination of the several parts of the general utility accessory devices for agricultural tractors and the like may be made and substituted for those herein shown and described without departing from the nature and principle of my invention.

Having thus described my invention, what I claim and desire to secure by Letters Patent is:

1. An accessory attachment for converting tractors and similar vehicles having hydraulic lifting mechanisms into fork-lift trucks; said accessory attachment comprising a pair of spaced parallel bars rigidly connected at one end by a transverse bar, a pair of upwardly converging bars rigidly connected together at their upper ends and respectively connected at their lower ends to the parallel bars entirely forwardly of the forwardmost portion of said transverse bar so that the portions of said parallel bar to which the ends of the transverse bar are attached will over-hang to the rear of the upwardly converging bar, a pair of upright brace-members attached at their lower ends to the transverse bar inwardly from the parallel bars and extending upwardly to the converging bars and being respectively attached at their upper ends to said converging bars whereby to form a cantilever bracing structure between the converging bars and the transverse bar, an auxiliary brace-bar rigidly mounted at its ends to the converging bars and extending transversely therebetween in upwardly spaced relation to the transverse bar, said auxiliary brace-bar being also connected rigidly to the up- right brace-members, and connector-means rigidly mounted upon the converging bars in upwardly spaced relation to the parallel bars for mounting the accessory attachment on the lifting mechanism of the vehicle.

2. An accessory attachment for converting tractors and similar vehicles having hydraulic lifting mechanisms into fork-lift trucks; said accessory attachment comprising a pair of spaced parallel bars rigidly connected at their rear ends by a transverse bar, a pair of upwardly converging straight bars rigidly connected together at their upper ends and respectively connected at their lower ends to the parallel bars entirely forwardly of and above the forwardmost portions of said transverse bar so that the portions of said parallel bar to which the ends of the transverse bar are attached will over-hang to the rear of the upwardly converging bar, a pair of upright brace-members attached at their lower ends to the transverse bar inwardly from the parallel bars and extending upwardly to the converging bars and being respectively attached at their upper ends to the rearwardly presented surfaces of said converging bars whereby to form a cantilever bracing structure between the converging bars and the transverse bar, an auxiliary brace-bar rigidly mounted at its ends to the upper ends of the upright brace-members and extending transversely therebetween in upwardly spaced relation to the transverse bar, said auxiliary brace-bar also being connected rigidly to the rearwardly presented surfaces of the converging members in the area of securement of the upper ends of the upright brace-members, and connector means rigidly mounted upon the converging bars in upwardly spaced relation to the parallel bars for mounting the accessory attachment on the lifting mechanism of the vehicle.

3. An accessory attachment for converting tractors and similar vehicles having hydraulic lifting mechanisms into fork-lift trucks; said accessory attachment comprising a pair of spaced parallel bars rigidly connected at their rear ends by a transverse bar, a pair of upwardly converging straight bars rigidly connected together at their upper ends and respectively connected at their lower ends to the parallel bars entirely forwardly of and above the forwardmost portions of said transverse bar so that the portions of said parallel bar to which the ends of the transverse bar are attached will over-hang to the rear of the upwardly converging bar, a pair of upright brace-members attached at their lower ends to the transverse bar inwardly from the parallel bars and extending upwardly to the converging bars and being respectively attached at their upper ends to the rearwardly presented surfaces of said converging bars whereby to form a cantilever bracing structure between the converging bars and the transverse bar, an auxiliary brace-bar rigidly mounted at its ends to the upper ends of the upright brace-members and extending transversely therebetween in upwardly spaced relation to the transverse bar, said auxiliary brace-bar also being connected rigidly to the rearwardly presented surfaces of the converging members in the area of securement of the upper ends of the upright brace-members, first connector-means rigidly mounted in and projecting axially from the opposite ends of the auxiliary brace-bar in upwardly spaced relation to the parallel bars for mounting the accessory attachment on the lifting mechanism of the vehicle, and second connector-means rigidly mounted at the apex formed by the converging bars for additionally connecting the accessory attachment to the lifting mechanism of the vehicle.

References Cited in the file of this patent

UNITED STATES PATENTS 2,791,340     Haines et al. _____ May 7, 1957

OTHER REFERENCES

Operator's Manual for John Deere Fork Lift, TP26, recd. Dec. 18, 1953, pp. 2 and 4.